Figure 3:
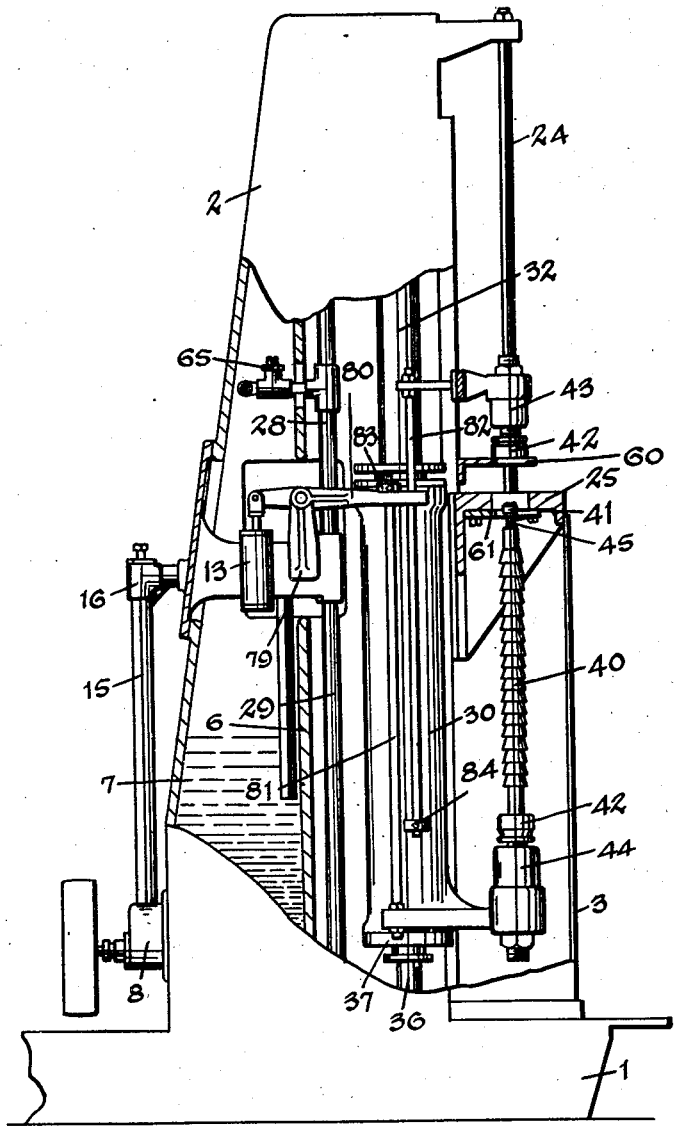

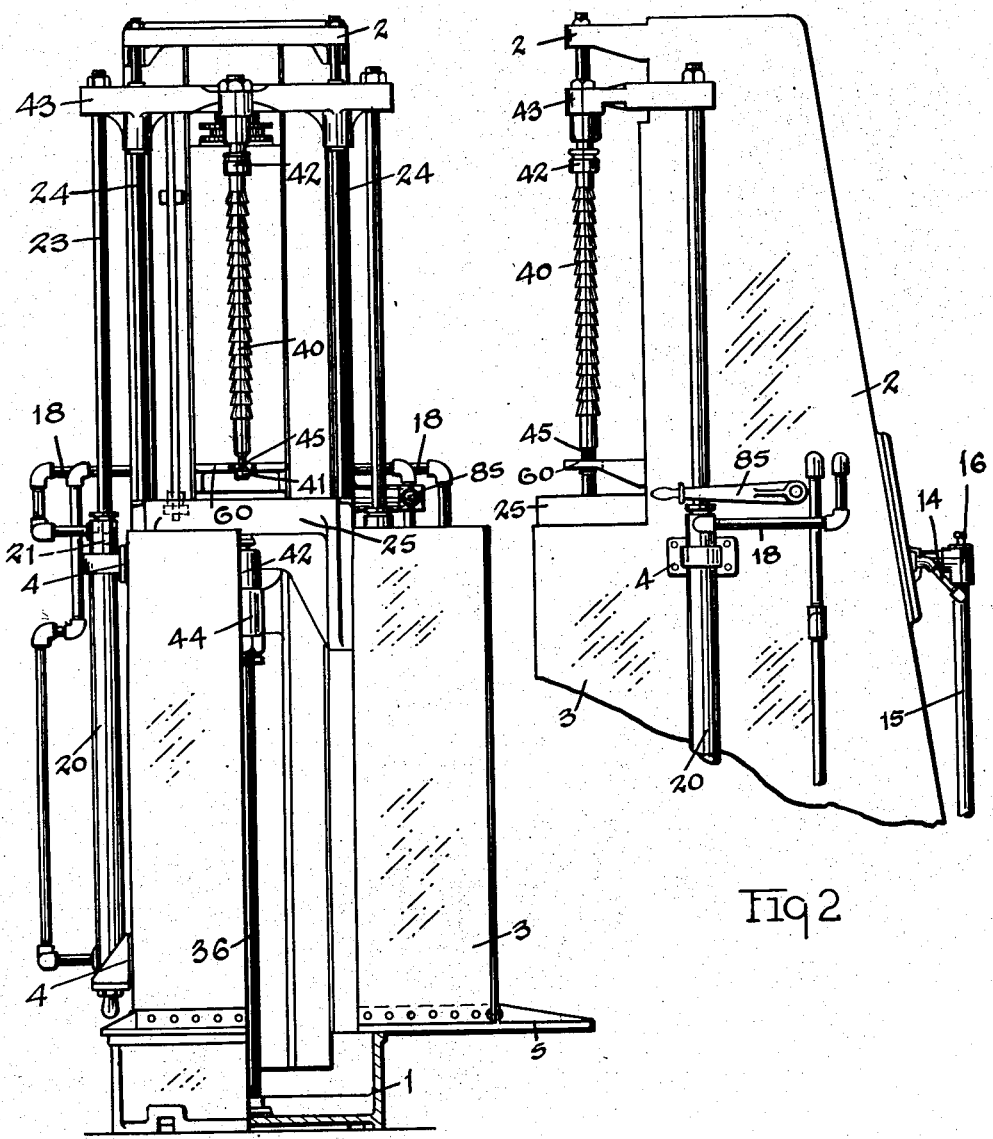

Nov. 28, 1933.   F. J. LAPOINTE   1,937,121
HYDRAULIC BROACH MACHINE
Filed Feb. 21, 1931   4 Sheets-Sheet 2

Inventor
Francis J. Lapointe
By
Attorney

Nov. 28, 1933.  F. J. LAPOINTE  1,937,121
HYDRAULIC BROACH MACHINE
Filed Feb. 21, 1931  4 Sheets-Sheet 3

Inventor
Francis J. Lapointe
By
Attorney

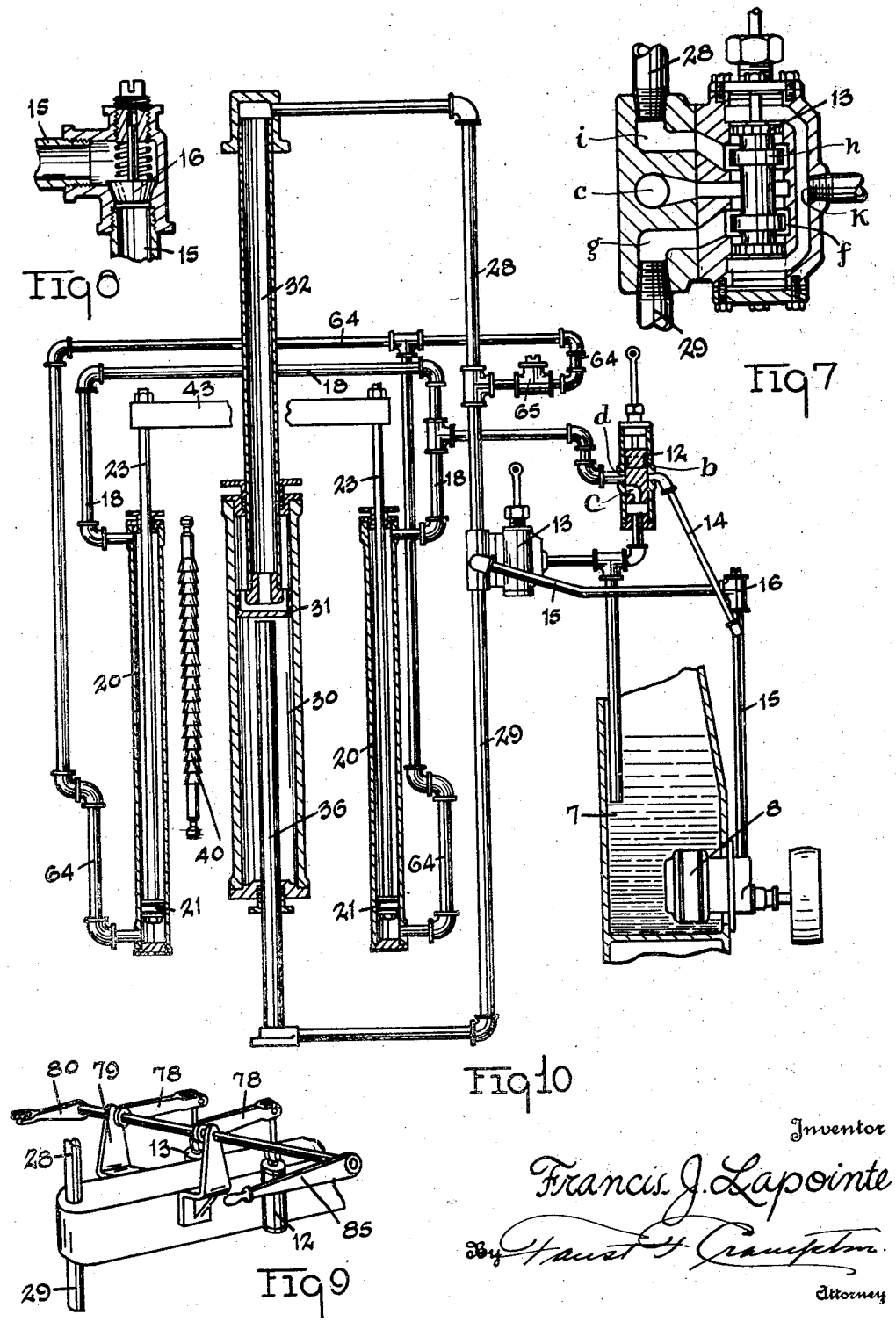

Patented Nov. 28, 1933

1,937,121

UNITED STATES PATENT OFFICE 1,937,121

HYDRAULIC BROACH MACHINE

Francis J. Lapointe, Ann Arbor, Mich.

Application February 21, 1931. Serial No. 517,386

9 Claims. (Cl. 90—33)

My invention has for its object to provide a machine for actuating a tool of a character that necessitates the connection and disconnection of the tool from the actuating element in order to locate the work and the tool in a working relation, the machine being provided with means for manipulating the tool during placement and displacement of the work before and after the operation of the tool on the work.

My invention has for its particular object to provide a hydraulic broach machine of vertical type which is so constructed as to pull the broach downward through a work plate, the work being located on the upper side of the work plate.

The invention also provides a means for actuating a tool such as a broach by pressure at its opposite ends by independently operating actuating means, which at the same time, constitute a means for maintaining the broach in alignment with the work.

The invention consists in other features and advantages which will appear from the following description and upon examination of the drawing. Structures containing the invention may partake of different forms and may be varied in their details and still embody the invention. To illustrate a practical application of the invention, I have selected a hydraulic broaching machine embodying the invention as an example of the various structures, and the details of such structures, that contain the invention, and shall describe the selected structure hereinafter, it being understood that variations may be made and that certain features of my invention may be used to advantage without a corresponding use of other features of the invention, and without departing from the spirit of the invention. The particular structure selected is shown in the accompanying drawing.

Figures 4, 5, 6:
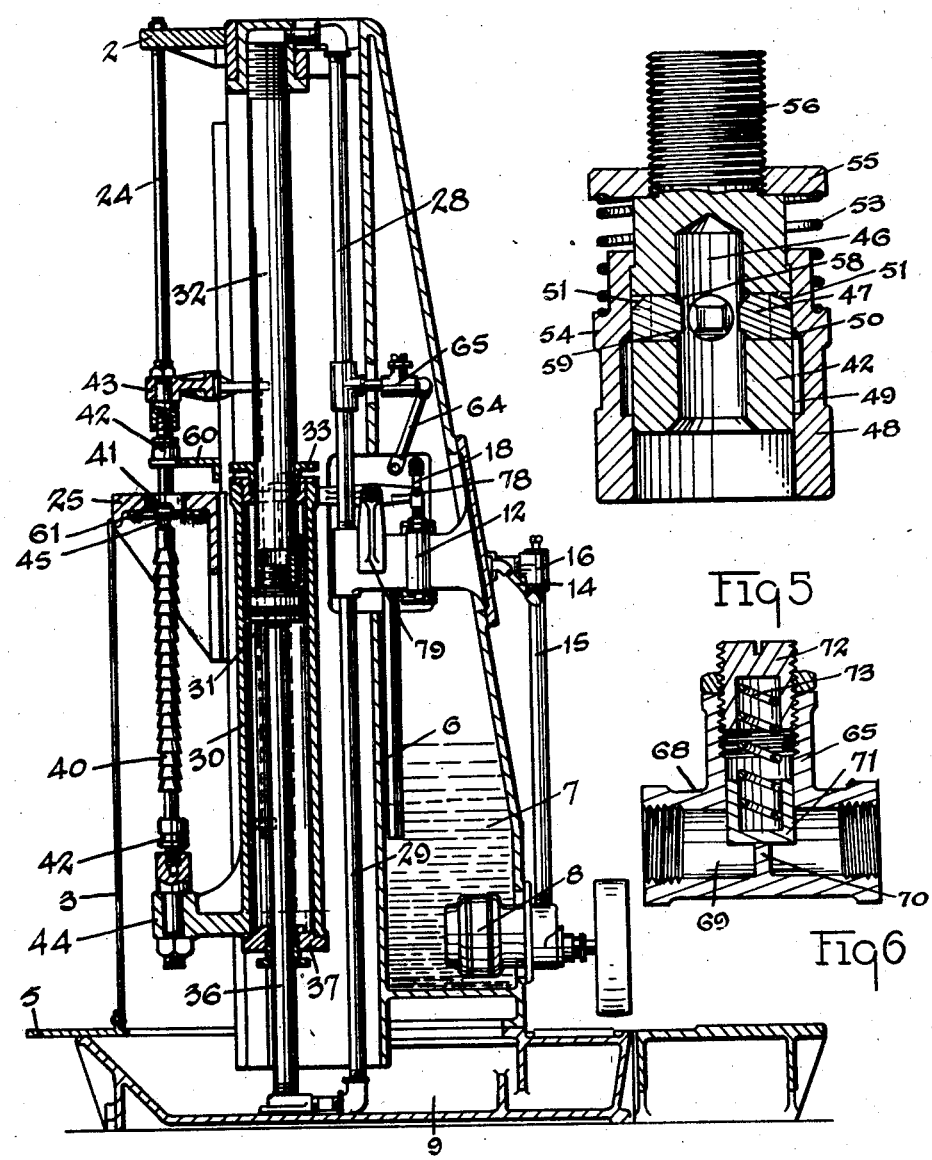

Fig. 1 of the drawing is a front view of the hydraulic broaching machine referred to. Fig. 2 is a side view of the upper part of the machine shown in Fig. 1. Fig. 3 is a side view of the machine, a part being shown in section. Fig. 4 illustrates a vertical section of a drawhead for automatically connecting and disconnecting the broach to the hydraulic actuated mechanism. Fig. 5 illustrates a vertical section through a tool locking head. Fig. 6 illustrates a view of a section of a restriction valve for diverting pressure in a branch circuit connected with the source of supply of the liquid for producing the desired sequential operations of the hydraulic actuating elements of the machine. Fig. 7 illustrates a section of one of the controlling valves of the broaching machine. Fig. 8 illustrates a restriction valve for producing relative movements of broach actuating elements of the machine. Fig. 9 is an illustration of the arrangement of the controlling levers and the controlling valves of the broaching machine. Fig. 10 is a diagrammatic arrangement of parts of the fluid pressure system whereby the broaching machine is actuated and controlled.

In the particular form of construction shown in the drawing, the hydraulic broaching machine is provided with a suitable base 1 and is enclosed, preferably, within a suitable shell or casing 2, that may be provided at its lower end with suitable doors 3 which are hingedly supported by means of the hinges 4. If desired, a suitable platform or step 5 may be secured to the shell or to the doors for locating the operator at the desired height, with respect to the work plate, on which the articles to be operated upon by the broach are placed.

The shell 2 is partitioned, as at 6, to form an oil reservoir 7 in which an oil pump 8, such as a gear pump, is located for transmitting oil under pressure to the cylinders of the broaching machine. Also, the base 1 is provided with suitable oil and chip receiving and separating chambers 9.

The flow of the oil from the pump 8 is controlled by a pair of valves 12 and 13 that are connected to the pipes 14 and 15. The pipe 14 is connected to the valve 12 and forms a branch from the pipe 15 which is connected to the valve 13. A suitable adjustable restriction valve 16 is located intermediate the pipe 15 and the valve 13. The restriction valve 16 may be of any form, well known in the art, such as a spring pressed one-way clap valve, having a valve member subjected to a spring and which may be overcome when the pressure of the oil in the pipe 15 reaches a certain pressure as determined by the valve adjustment. The pipe 14 is connected with the pipe 15 at a point below the resistance valve 16. The oil may pass through the pipe 14 to the valve 12 with a pressure less than that required to open the valve 16 and permit oil to pass to the valve 13.

The valve 12 is a one-way valve and when opened connects the pump 8 through the pipe 14 with a pipe 18. The ends of the pipe 18 communicate with a pair of cylinders 20, in which are located suitable pistons 21 that are interconnected so as to move together as a unit. When the pressure, transmitted from the pump 8, to the upper ends of the cylinder 20, reaches a certain point, as determined by the adjustment of the restriction valve 16, the oil will also flow through the valve 16 to the valve 13. The valve 13 is a two-way valve and directs oil either through the pipe 28 or the pipe 29, depending upon the position of the valve 13. The pipes 28 and 29 communicate with the upper and lower ends of the cylinder 30 in which the piston 31 is located. Preferably, the piston 31 is a stationary piston and is supported on the end of a large hollow stem 32 which is secured, at its upper end, to the top of the shell or case 2, and at its lower end to the piston 31. The stem 32 extends through the cylinder head 33 of the cylinder which is provided with suitable packing rings or nuts for sealing the interior of the cylinder. The stem 32 communicates with the interior of the cylinder at a point just above the piston. A pipe 36 extends from the base 1 through the cylinder head 37. Its open end is located at a point near the lower side of the piston 31. The pipe 28 communicates with the stem 32, and the pipe 29 communicates with the pipe 36 and the connections of the pipes with the pump 8 are controlled by the valves 12 and 13.

The valves 12 and 13 have controlling members that are so related that when the oil pressure exerted through the pipes 14 and 18, by way of the valve 12, is resisted to a certain degree, the adjustable restriction valve 16 is overcome by the pressure of the oil within the pipe 15. The pressure and the oil is then transmitted through the valve 13, through the pipes 29 and 36, and thus when the pressures exerted reach the amount determined by the restriction valve 16, the cylinder 30 will move in the same direction that the pistons 21 are moved. This will continue until the valves are closed or reversed, or until the pressure of the oil in the cylinders is not equal to that produced by some resisting obstacle that may be in the path of movement of one of the elements actuated by the pistons and cylinders.

In order that the hydraulic actuating elements may operate the broach, or other tool, used in the machine and also enable the location and removal of the articles in position on the work plate, means is provided for so manipulating the tool as to displace it from the surface of the work plate upon completion of the working stroke. Thus the piston 31 discontinues its downward movement while the tool is further moved, by the cylinder and piston 30 and 31, below the work plate 25. This enables the removal of the article that has been operated upon by the broach. The valves of the actuating mechanism of the machine are then operated to cause movement of the tool upward. The tool is moved upward until the broach is released from its connection with the cylinder and piston 30 and 31 and is carried above the work plate 25 by the operation of the cylinder and piston 20 and 21. Thus the lower end of the broach is displaced from the work plate 25 so that articles may be placed in position to be engaged by the broach in the subsequent operation of the broaching machine.

The broach 40 is provided with two heads 41 located at opposite ends of the broach. Tool lockingheads or drawheads 42 are connected to the cylinder and piston 30 and 31 and also to the piston and cylinder 20 and 21. In the particular construction shown, one drawhead 42 is connected to the crosshead 43 and the other drawhead is connected to the bracket 44. The crosshead is connected to the piston rods 23 and is guided in its movements by the guide rods 24. The bracket 44 is connected to, and forms an integral part of, the cylinder 30. The drawheads or lockingheads 42 are provided with means for automatically locking and unlocking the heads 41 of the broach 40 to the crosshead 43, in one case, or to the bracket 44, in the other case. The broach is provided with necks 45 located intermediate the heads 41 and the body of the broach. The drawheads 42 are provided with sockets 46 in which the heads 41 may be inserted. The drawheads 42 are provided with a plurality of radially slidable dogs 47 that are adapted to positively engage the heads 41, when the inner ends of the dogs 47 are moved beneath the heads 41 and into the space afforded by the necks 45. The dogs 47 are slidably movable inwardly in slots formed within the drawhead 42. Each lockinghead 42 is provided with a sleeve 48 movable along the head 42. The sleeve 48 is provided with a channel 49 having the inclined lateral or conical surface 50, while the dogs 47 are provided with inclined or beveled surfaces 51 that cooperate with the surfaces 50 to cause the dogs 47 to move inward when the sleeve 48 is moved along the surface of the drawhead 42. The length of the dogs 51 is slightly greater than the thickness of the wall of the head 42 which forms the socket 46. When, therefore, a head 41 of the tool is placed in either of the drawheads 42, and pushed inward, it will operate to push the dogs 47 outward, provided the sleeve 48 is so positioned as to enable the dogs 47 to move into the channel 49. If then the sleeve 48 is moved, the dogs 47 will be pushed inward by the coacting surfaces 50 and 51 so as to engage the head 41 in the drawhead 42. Preferably, the drawheads 42 are provided with springs 53 that operate, normally, to press the sleeve 49 outward. The springs 53 are located intermediate shoulder portions 54 formed on each sleeve 48 and the threaded nut, or disc, 55, that may be located on the shank of the drawhead 42. Thus, when the sleeve 48 is pushed towards the shank 56 of the drawhead, the broach may be drawn from the socket, the head being so formed that it will coact with the beveled corners 58 of the dogs 47 as to push them outward. Also when the sleeve 48 is in this position, the head 41 may be placed within the socket 46, the head operating to press against the beveled corners 59 of the dogs to push them outward. When, however, the sleeve 48 is released and moved by the spring 53, it will engage the outer ends of the dogs 47 to hold them in tool locking positions, since the head 41 will be retained within the socket 46 by the inwardly projecting ends of the dogs 47.

In order to release the ends of the broach 40 from the drawheads or lockingheads 42, suitable stops 60 and 61 are secured to fixed parts of the machine for engaging the sleeves 48 to release the dogs 47. The stop 60 may be made in the form of a forked bracket located a short distance above the work plate 25. When, therefore, the tool 40 has been moved downward by the operation of the cylinder 30 and piston 31, the sleeve 48 engages the bracket 60, which releases the upper head 41 of the broach 40 from the drawhead 42. As the broach continues its descent by the operation of the cylinder 30 and the piston 31, its upper end is moved below the surface of the top of the plate 25, whereupon the article may be readily removed, the broaching operation having been completed. The further downward movement of the broach may be stopped by the reversal of the flow of the fluid into the cylinder 30 by the manipulation of the valve 13, while at the same time the valve 12 may be also reversed to reduce the pressure in the cylinder 20 and allow the return of the oil to the reservoir 7 from the cylinder 20 when the piston 21 returns. Upon the reversal of the valve 13, which connects the stem 32 with the pipe 15, the broach is lifted until the head 41 enters the drawhead 42 that is connected to the crosshead 43 and pushes the upper drawhead 42 upward until the sleeve 48 is released from the bracket 60, whereupon the upper end of the tool is connected to the crosshead 43. This continued upward movement produced by the operation of the cylinder 30 and the piston 31, causes not only the removal of the oil below the piston 31, through the pipes 36 and 29 and through the valve 13 to the reservoir 7, but also forces the oil, located above the pistons 21, through the pipes 18 to the valves 12 and thence into the reservoir 7.

In order that the cylinders 20 and the pistons 21 may aid in the upward movement, the lower ends of the cylinder 20 may be connected to the pipe 28 through the pipes 64 and the two-way restriction valve 65. The restriction valve 65 enables the flow of the liquid from the pipe 28 into the cylinders 20 when the pressure in the pipe 28 reaches a point sufficient to overcome the restriction valve 65. This is to place the burden of the pressure upon the cylinder and piston 30 and 31 and prevent the cylinders and pistons 20 and 21 from moving away from the tool as the cylinder 30 is advanced to locate the upper head 41 of the tool within the upper lockinghead 42 and while there is no load on the piston and cylinder assembly 30 and 31, with the result that when the lower lockinghead 42 is raised, so as to engage the stop 61, further upward movement of the cylinder 30 will be discontinued but the pressure of the oil will in the cylinders 20 operate to move the tool 40 upward until the valve 12 is closed or reversed.

The stop 61 may be made in the form of a plate and secured to the under side of the work plate 25. When the lower drawhead 42 engages the plate 61, the lower end of the broach is released and the increased pressure, within the cylinders 20, operates to lift the broach 40 above the work plate and enables the location of another article in position to be broached. The valves 12 and 13 may then be reversed and then the flow of the oil is through, first, the pipe 14, the valve 12 and the pipes 18, to move the crosshead 43 down to insert the lower end of the broach through the work and the lower head 41 into the lower lockinghead 42. Pressure of the lower head 41 in the bottom of the socket increases the resistance to movement of the broach and increases the pressure of the oil, which opens the valve 16, and the cylinders 30 and 20, operating in connection with their associated pistons, move the broach through the work to produce the working stroke and until the upper drawhead or lockinghead 42 again engages the bracket 60 as before.

In order to enable the removal of the oil from the lower side of the pistons 21 in the cylinders 20, during a working stroke, and also to retard the movement of the pistons 21 at the beginning of the lifting stroke, the two-way restriction valve 65 resists the movement of the oil to and from the pipe 28. The two-way resistance valve has a T-shaped shell 68. Within the passageway 69 through the shell, is located a partition 70, one edge of which extends diametrically through the passageway 69, and a spring pressed valve member or plunger 71, is pressed against the edge of the partition 70. The plunger 71 has substantially the diameter of the part of the passageway 69 in which the partition 70 is located and, consequently, the passageway is closed by the spring pressed plunger 71 and the partition 70. A plug 72 may be threaded into one part of the shell 68. The plunger 71 and the plug 72 may be made in the form of thimbles and a spring 73 may be located within the plunger and the plug to press the plunger 71 towards the edge of the partition 70 and operate to close and open the passageway 69 according to whether the pressure of the oil within the passageway is sufficiently great to overcome the pressure of the spring 73. The restriction valves 16 and 65 may be adjusted relative to each other to produce the required delayed movements of the actuating means to enable connection of the ends of the broach.

The valves 12 and 13 may be operated separately, or together, and either manually or automatically. In the form of construction shown, provision is made for either manual or automatic operation of both of the valves. A bifurcated lever 78 is pivotally supported on the brackets 79 and is operatively connected to the valves 12 and 13. It has an arm 80. A pair of rods 81 and 82 move through the arm 80. The rods are provided with stops 83 and 84 that are adjustably secured to end parts of the rods 81 and 82. The rod 82 is connected to the crosshead 43 while the rod 81 is connected to the bracket 44. When, therefore, the stop 83, connected to the rod 81, engages the arm 80, the flow of the oil through the valves 12 and 13 is reversed which reverses the movement of the broach 40 operated by the piston and cylinder 30 and 31. When, however, the stop 84 engages the arm 80, in the upward travel, the valves 12 and 13 are again reversed and the crosshead 43 begins its downward travel by reason of the free flow of oil through the pipe 14 and the restricted flow through the valve 16, and until the connection between the upper head 41, of the broach, is made with the lockinghead connected to the crosshead 43. The stop 83 and 84 may be adjusted on the rods to either close the valves or reverse the flow through the valves. To lower the broach, the oil is forced through the pipe 15 by the operation of the pump 8 and through the pipe 14 to the valve 12. Meantime the cylinders 20, receiving oil through the pipes 15, 14, and 18, operate the pistons 21 to connect the broach to the broach head of the cylinder 30, and until the pistons 21 have lowered sufficiently to press the head of the broach against the bottom of the broach socket in the drawhead of the cylinder 30. The pressure of the oil in the pipe 15 is raised sufficiently to overcome the resistance through the valve 16, whereupon the oil, at that higher pressure, is transmitted through the pipe 29, which forces the cylinder 30 and its drawhead downward and draws the broach through the work. The oil passes into the port $e$ of the valve 13 and out through the port $g$, the flange $h$ of the movable valve member being moved in position to cut off exit through the port $i$. The oil returns from the cylinder 30 through the pipes 32 and 28 to the valve 13, entering through the port $i$ and passing out through the port $k$ to the pipe which is connected to the reservoir 7. The oil also passes through the pipe 14 and passes the movable valve member which has a channel $b$, that establishes communication between the pipe 14 and the pipe 18, and into the cylinders 20. The return flow from the cylinders 20 is through the pipe 64 to the pipe 28 which is connected through the valve 13 to the reservoir 7. On the completion of the broaching stroke, the valves 12 and 13 are reversed and the pressure of the oil from the pump 8 is directed through the port $e$ into the pipe 28 and the pressure causes the rise of the cylinder 30. The pressure being sufficient to overcome the resistance valve 65, it passes through the pipe 64 and causes the rise of the pistons 21. The return from the cylinder 30 is through the pipe 36 to the pipe 29 and through the ports $g$ and $h$ of the valve 13. The return from the cylinders 20 is through the pipe 18 to the port $d$ of the valve 12 which is raised sufficiently to connect the passageway $c$ to the port $d$, which then returns the oil to the reservoir. The flow of oil continues until the drawhead 42, connected to the cylinder 30, engages the underside of the face plate 25 and the broach is uncoupled from the drawhead of the cylinder 30. The pressure of the oil through the pipe 15 causes the oil to continue to flow through the pipe 64 and the pistons 21 continue to rise, which raises the broach above the work plate and the valves reverse. Before the valves reverse the work is placed in position. The broach is then automatically inserted through the work and moves down until it is coupled with the drawhead connected to the cylinder 30, and the operation repeats, as described above, the oil passing through the ports of the valves 12 and 13 to and from the cylinders 20.

The valve 65 is thus a two-way resistance valve that controls the flow to and from the cylinders 20 and may be utilized for automatically delaying responsiveness to the pressure that is created for a great variety of purposes. It differs from the valve 16 which prevents a return flow and resists only a one-way flow. The valves 65 and 16 are made adjustable to establish the desired relation to each other and to the pressures required to divide the pressure and operate the cylinder 30 and pistons 21. The resistance of valve 16 to the flow of oil is made greater than the resistance of the valve 65. Thus the pistons and cylinders operate to continually move the broach reciprocally and intermediate the completion of the downward stroke and the beginning of the upward stroke of the tool, the articles may be removed and, intermediate the completion of the upward movement of the broach and the downward movement, and also intermediate the completion of the upward stroke and the beginning of the downward stroke, the articles may be placed in position for operation of the broach.

The lever 78 may also be provided with an arm 85 that is located exterior to the shell or case 2. It may be provided with a suitable handle for manipulation whereby the valves 12 and 13 may be closed or reversed at any time, in order to stop or reverse the machine as may be desired.

I claim:

1. In a hydraulic broaching machine, a work plate for supporting the articles to be broached, an actuating cylinder and piston, a broach locking head operated by the cylinder and piston and located on one side of the work plate, a second cylinder and piston, a second locking head operated by the second cylinder and piston and located on the other side of the work plate, limiting stops located on the opposite sides of the work plate and in proximity thereto for limiting the movements of the locking heads, each of the locking heads having means for releasing the broach by pressure against the limiting stops.

2. In a hydraulic broaching machine, a work plate for supporting the articles to be broached, an actuating cylinder and piston, a broach locking head operated by the cylinder and piston and located on one side of the work plate, a second cylinder and piston, a second locking head operated by the second cylinder and piston and located on the other side of the work plate, a source of supply of fluid under pressure, a part having a divided passageway for connecting the said source with both of the said cylinders, one of the said divisions of said passageways having a yielding means for restricting the movement of the fluid through the said division to produce initial actuation of one cylinder and piston in advance of initial movement of the other cylinder and piston.

3. In a hydraulic broaching machine, a work plate for supporting the articles to be broached, an actuating cylinder and piston, a broach lockinghead operated by the cylinder and piston and located on one side of the work plate, a second cylinder and piston, a second lockinghead operated by the second cylinder and piston and located on the other side of the work plate, a source of supply of fluid under pressure, a part having a divided passageway for connecting the said source with both of said cylinders, one of said divisions of said passageway having a yielding means for restricting the movement of the fluid through the said division to produce initial actuation of one cylinder and piston in advance of the other cylinder and piston, a second part having a passageway for the return of the fluid to said source from one of the said cylinders and having means for resisting the return movement of the fluid from the last named cylinder to insure the completion of the return strokes of both of said cylinders and pistons.

4. In a hydraulic broaching machine, a work plate supporting the articles to be broached, an actuating cylinder and piston, a broach lockinghead operated by the cylinder and piston and located on one side of the work plate, a second cylinder and piston, a second lockinghead operated by the second cylinder and piston and located on the other side of the work plate, a source of supply of fluid under pressure, a part having a divided passageway for connecting the said source with both of said cylinders, one of said divisions of said passageway having a yielding means for restricting the movement of the fluid through the said division to produce initial actuation of one cylinder and piston in advance of the other cylinder and piston, a second part for the return of the fluid to said source from one of the said cylinders and having means for resisting the return movement of the fluid from the last named cylinder a limiting stop for limiting the return movement of the said actuating cylinder and piston but allowing completion of the stroke of the said second piston and cylinder to insure movement of the tool from the work plate a distance sufficient to enable insertion of the work intermediate the work plate and the end of the tool in advance of a working stroke of the cylinders and pistons.

5. In a hydraulic broaching machine, a work plate for supporting the articles to be broached, an actuating cylinder and piston, a broach lockinghead operated by the cylinder and piston and located on one side of the work plate, a second cylinder and piston, a second lockinghead operated by the second cylinder and piston and located on the other side of the work plate, a pair of limiting stops located on opposite sides of and in proximity to the working plate and operable to open the lockingheads to release the broach, a source of supply of fluid under pressure, a part having a divided passageway for connecting the said source with both of said cylinders, one of said divisions of said passageway having a yielding means for restricting the movement of the fluid through the said division to produce initial actuation of one cylinder and piston in advance of the other cylinder and piston to connect the broach with the last named cylinder and piston and to cooperate therewith in moving the broach.

6. In a hydraulic broaching machine, a work plate for supporting the articles to be broached, an actuating cylinder and piston, a broach lockinghead operated by the cylinder and piston and located on one side of the work plate, a second cylinder and piston, a second lockinghead operated by the second cylinder and piston and located on the other side of the work plate, a pair of limiting stops located on opposite sides of and in proximity to the working plate and operable to open the lockingheads to release the broach, a source of supply of fluid under pressure, a part having a passageway for connecting the said source with both of said cylinders, and a part having a passageway for returning fluid from the cylinders to the said source of supply, the last named part having a yielding means for restricting the movement of the fluid through the said last named part to cause one of the cylinders and pistons to resist movement by the other of the cylinders and pistons until the lockinghead of the other cylinder and piston is pressed against the stop and for continued movement of the first named cylinder and piston to space the broach from the work plate sufficient to permit the insertion of the work between the tool and the work plate.

7. In a hydraulic broaching machine, a work plate for supporting the articles to be broached, an actuating cylinder and piston, a broach lockinghead operated by the cylinder and piston and located on one side of the work plate, a second cylinder and piston, a second lockinghead operated by the second cylinder and piston and located on the other side of the work plate, a pair of limiting stops located on opposite sides of and in proximity to the working plate and operable to open the lockingheads to release the broach, a source of supply of fluid under pressure, a part having a divided passageway for connecting the said source with both of said cylinders, one of the divisions of the passageway having a means for resisting flow of fluid through said division for retarding the initial movement of one cylinder until the other cylinder has made its initial movement and coacts with the other cylinder to move the tool through a working stroke, a part having a passageway for returning fluid from the cylinders to the said source of supply, the last named part having a yielding means for resisting the movement of the fluid through the said last named part to cause one of the cylinders and pistons to resist movement by the other of the cylinders and pistons until the lockinghead of the other cylinder and piston is pressed against the stop and for continued movement of the first named cylinder and piston to space the tool from the work plate sufficient to permit the insertion of the work between the tool and the work plate.

8. In a hydraulic broaching machine, a work plate for supporting the articles to be broached, an actuating cylinder and piston, a pair of broach locking heads having means for automatically opening the locking heads upon pressure against the locking heads and operable to engage or release the broaching tool, one broach locking head operated by the cylinder and piston and located on one side of the work plate, a second cylinder and piston, the other locking head operated by and piston, the second cylinder and piston and located on the other side of the work plate, limiting stops located on the opposite sides of the work plate and in proximity thereto, each operating its respective locking head to engage and release the broaching tool.

9. In a hydraulic broaching machine, a work plate for supporting the articles to be broached, an actuating cylinder and piston, a pair of broach locking heads having means for automatically opening the locking heads upon pressure against the locking heads and operable to engage or release the broaching tool, one broach locking head operated by the cylinder and piston and located on one side of the work plate, a second cylinder and piston, the other locking head operated by the second cylinder and piston and located on the other side of the work plate, limiting stops located on the opposite sides of the work plate and in proximity thereto, each operating its respective locking head to engage and release the broaching tool, a source of supply of fluid under pressure connected to the cylinders, and means for directing the fluid to the cylinders to produce coaction of the cylinders and pistons to move the locking heads in the same direction during the same periods.

FRANCIS J. LAPOINTE.